May 24, 1927.
H. A. BENEDICT ET AL
1,629,903
VEHICLE WHEEL
Filed March 28 1925    2 Sheets-Sheet 2
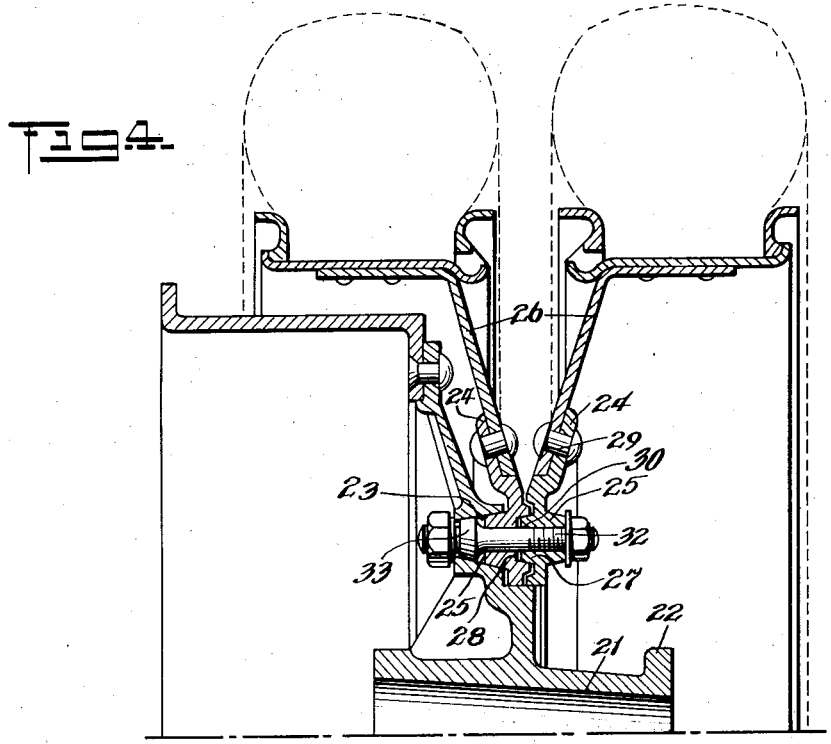
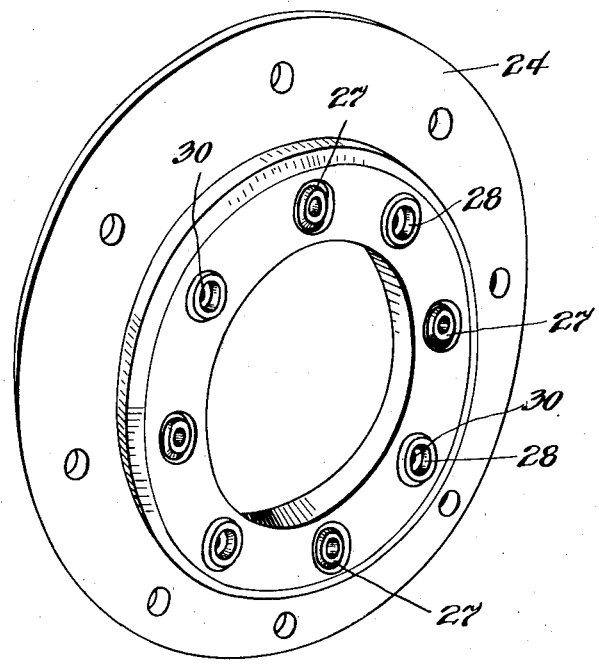
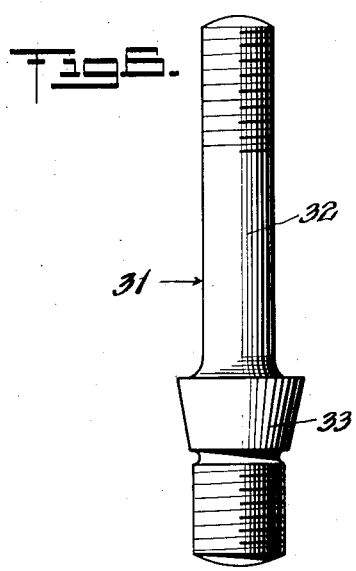
INVENTORS
*Herschel A. Benedict*
*Edward M. Moller*
BY
*King & Schlatt*
ATTORNEYS Patented May 24, 1927.

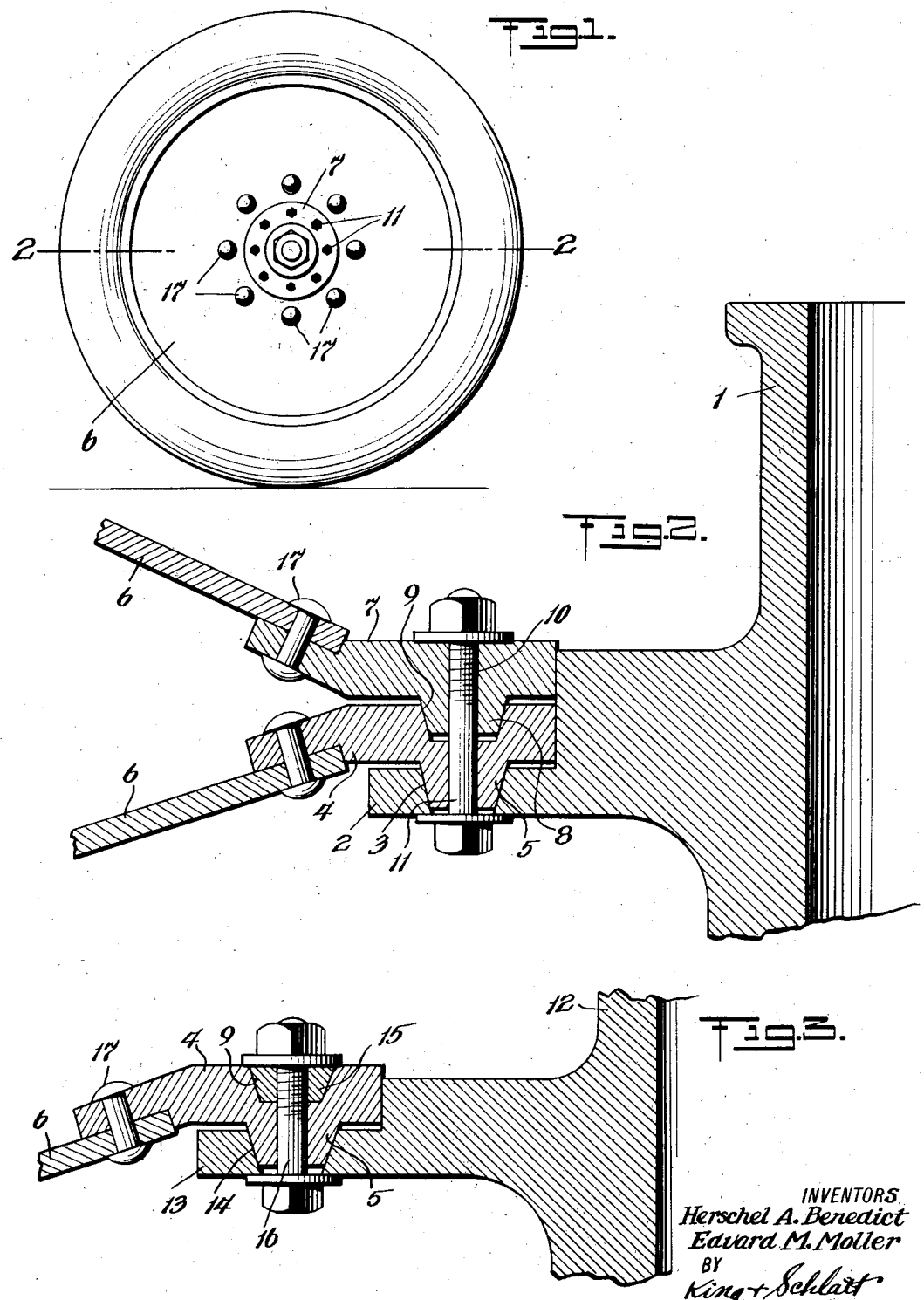

1,629,903

UNITED STATES PATENT OFFICE.

HERSCHEL A. BENEDICT, OF EAST ORANGE, AND EDVARD M. MOLLER, OF SOUTH ORANGE, NEW JERSEY.

VEHICLE WHEEL.

Application filed March 28, 1925. Serial No. 18,932.

The objects of the invention are to provide a vehicle wheel which will be rigid, and which can be assembled to retain its rigidity; to prevent the parts from becoming loose by wear; to provide a structure especially adapted to disc wheels; to prevent elongation of the holes where the disc is bolted to the hub; to thus prevent relative movement or oscillation between the disc and the hub; to avoid sheering the engaging bolt, to enable an ordinary bolt to be employed for securing parts together; to secure a device which will enable the wheels ordinarily employed on the front of a vehicle to likewise be employed on the rear axle of the vehicle; to enable the disc to be employed with a supplemental disc for the purpose of providing a double wheel; to provide a structure wherein either of the discs constituting the double rear wheel may be used as a single front wheel; to make all the wheels alike so as to enable any one to be used as either one of the double rear wheels; to provide a structure which can be readily and accurately manufactured; to secure simplicity of construction; operation, mounting and de-mounting, and to obtain other objects and results as may be brought out in the following description.

Referring to the accompanying drawings in which like numerals of reference indicate similar parts throughout the several views, Fig. 1 is a side elevation of a wheel employing our invention;

Fig. 2 is a cross-sectional view through a portion of the hub and disc on a line indicated by numerals 2—2;

Fig. 3 is a similar cross-sectional view showing the construction employed in connection with a wheel having a single tire;

Fig. 4 is a sectional view of a portion of a wheel showing a still further modified construction;

Fig. 5 is a perspective view of the central portion or plate of said wheel; and

Fig. 6 is a view in elevation of one of the secured bolts used in connection with the modified structures of Figs. 4 and 5.

In the specific embodiment of the invention illustrated in said drawing, and particularly Figures 1 and 2, the reference numeral 1 indicates the hub of a wheel, said hub having an outstanding flange 2 provided with a plurality of tapered holes 3, preferably arranged equal distances apart, and equal distances from the center of the hub. In carrying out the invention we provide a plate 4 having a plurality of tapered lugs 5 spaced from each other and from the center of the said plate exactly the same as said tapered holes in the flange of the hub. This will therefore enable the plate 4 to be positioned flatwise with respect to the said flange with the lugs of the plate entering the holes 3 of the flange. The tapering of the lugs and holes are likewise the same so there will be a considerable bearing surface between the lugs and the holes when the lugs are drawn down into the holes.

The outer or circumferential portion of the plate 4 is riveted, as at 17, or otherwise secured to the disc 6 forming part of the wheel at the outer circumference of which is the usual rim for receiving the tire. The plate 4 may be made of cast steel or other hard material and will accordingly not be subject to wear or be likely to break. By riveting the disc 6 to the side plate, a very secure joining of the parts may be obtained and no likelihood of the same becoming loosened will exist. However, the usual attachment by which the disc is removably secured to the hub is likely to cause trouble, and it is this attachment wherein the present invention inheres more particularly.

In order to provide a wheel wherein two tires may be employed which is a common practice on heavy vehicles, such as trucks and buses, we provide means for mounting two plates upon the single hub, each plate having its own disc 6 and its own rim and tire. In carrying out this feature of our invention, we provide a second or outer plate 7 also having tapered lugs 8 preferably arranged the same distances apart and the same distance from the center of the plate as the lugs 5 of the first mentioned or inner plate 4. The said inner plate 4 is provided with tapered holes or sockets 9 preferably in axial alinement with the lugs 5 of said plate, and having the same taper as the lugs 8 of the outer plate so as to fit the same and enable the lugs of the outer plate to be inserted in said sockets and be drawn thereinto so as to firmly mount the two plates together and support said plates upon the hub. The plates are both provided with bolt holes 10 preferably axially arranged with respect to the lugs so as to permit a bolt 11 to be inserted through the said holes with the head overlying the flange of the hub thereby enabling the bolt to draw the plates into position and hold the same firm. It may here be noted that the outer plate of Fig. 2 differs only in slight respects from the inner plate, particularly in the fact that the outer marginal portions of said plates are bent in opposite directions so the discs 6 will slope away from each other thereby securing sufficient distance between the discs at their outer peripheries for accommodating the necessary rims and tires. It may be observed that the stress or torque between the hub and discs is applied to the plates by the inter-engagement of the lugs in the holes or sockets, and that the bolt 11 functions only in securing parts together. For this reason an ordinary bolt may be employed, and there is no danger of enlargement of the holes or sockets for the lugs because the lugs are held always in close contact with the tapered sockets and also because the plates are made of hardened material. In this manner we avoid any tendency to sheer the bolt and provide lugs which are both large enough and of such shape that the stress will not be effective to sheer them or enlarge the sockets.

In order to provide a single outer wheel, the same disc 4 may be employed, as shown in Fig. 3. In said figure, a hub 12 is shown having a flange 13 with tapered hole 14. Lug 5 of plate 4 fits into the tapered openings or sockets 14 just the same as described above in connection with sockets 3. In this instance, we preferably employ a frusto-conical filler 15 for the outer socket 9 so as to bring the surface flush at the outside of the plate. The filler 9 and plate have a hole extending through them for receiving bolt 16 which will hold the lug 5 in the socket as well as retain the filler 15 within its socket. By utilizing the same plate 4 in connection with a single outer wheel that is used in connection with the double outer wheel, it is unnecesary to carry an extra spare for the front wheel, since one of the rear wheel spares may be employed on a front wheel should it become necessary.

Referring more specifically to Figs. 4, 5 and 6, which constitute preferred embodiment of our invention, we have shown therein a hub 21 having an outstanding flange 22 with a plurality of tapered holes 23 as has already been described in connection with the structure shown in the preceding figures. We provide two plates and discs, for making up a double wheel, both of these plates being identical so as to be interchangeable. Each plate, indicated by numeral 24, is provided with tapered lugs 25 spaced from each other and from the center of the plate corresponding to the spacing of the holes in the flange of the hub. The outer or circumferential portion of the plate 4 is riveted, as at 29, or otherwise secured to a disc 26 forming part of the wheel at the outer circumference of which is the usual rim for receiving the tire.

On the other side of said plate from tapered lugs 25, are alternate tapered lugs 27 and recesses 28 preferably arranged in axial alinement with the lugs 25 on opposite side of plate 24. By spacing the alternate lugs and recesses even distances apart and symmetrically arranged, the lugs of one plate will enter the recesses of the other and vice versa when similar faces of said plates are put together as clearly shown in Fig. 4. Furthermore we preferably provide the same taper for the lugs 27 as provided for the recesses 28 so as to enable the lugs of the one plate to be inserted and seated in said recesses of the other plate.

The plates are both provided with bolt holes 30 preferably axially arranged with respect to the lugs so as to permit a bolt 31 to be inserted through said holes for securing the parts together. In this connection it may be noted that in the structure now being described a special form of bolt is preferably employed. This bolt includes a shank portion 32 threaded at both ends. Near one end is provided a tapered collar 33 of appropriate size and at the proper distance from the end of the bolt to fit into the tapered socket 23 of the hub flange between the small end of said tapered socket and the inner end of the lug 25 of the removable plate. A nut on that end of the bolt will accordingly draw the bolt to firmly seat said tapered collar and thus mount the bolt rigidly and axially within the said socket. The two plates for the two wheels may be slid on to the several bolts, and nuts on the outer ends of the bolts will then draw the plates toward the flange and the lugs toward the small ends of the tapered sockets and thus very securely mount the plates in position.

Obviously detail changes and modifications may be made in the manufacture and use of our improved vehicle wheel, and we do not wish to be understood as limiting ourselves to the exact structure shown except as set forth in the following claim when construed in the light of the prior art.

Having thus described our invention we claim:—

A disc wheel comprising a central plate of heavy material having hub engaging means thereon and a disc of lighter material secured thereto thereby providing a disc wheel having attaching means of greater strength than the disc.

HERSCHEL A. BENEDICT.
EDVARD M. MOLLER.